(12) United States Patent
Brehler et al.

(10) Patent No.: US 8,098,567 B2
(45) Date of Patent: Jan. 17, 2012

(54) TIMING ADJUSTMENTS FOR CHANNEL ESTIMATION IN A MULTI CARRIER SYSTEM

(75) Inventors: Matthias Brehler, Boulder, CO (US); Joseph Chan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 11/777,251

(22) Filed: Jul. 12, 2007

(65) Prior Publication Data

US 2008/0219144 A1  Sep. 11, 2008

Related U.S. Application Data

(60) Provisional application No. 60/893,058, filed on Mar. 5, 2007.

(51) Int. Cl.
*H04J 11/00* (2006.01)
(52) U.S. Cl. .......................... 370/203; 370/208; 375/260
(58) Field of Classification Search .................. None
See application file for complete search history.

(56) References Cited

U.S. PATENT DOCUMENTS

| | | | |
|---|---|---|---|
| 4,630,305 A | 12/1986 | Borth et al. | |
| 5,790,939 A | 8/1998 | Malcolm et al. | |
| 5,852,630 A | 12/1998 | Langberg et al. | |
| 5,912,931 A | 6/1999 | Matsumoto et al. | |
| 6,269,075 B1 | 7/2001 | Tran | |
| 6,456,654 B1 | 9/2002 | Ginesi et al. | |
| 6,539,063 B1 | 3/2003 | Peyla et al. | |
| 6,654,429 B1 | 11/2003 | Li | |
| 6,771,591 B1 | 8/2004 | Belotserkovsky et al. | |
| 6,859,505 B2 | 2/2005 | Agami et al. | |
| 6,996,385 B2 | 2/2006 | Messier et al. | |
| 7,027,540 B2 * | 4/2006 | Wilson et al. | ............. 375/354 |
| 7,158,770 B2 | 1/2007 | Hanaoka et al. | |
| 7,161,987 B2 | 1/2007 | Webster et al. | |

(Continued)

FOREIGN PATENT DOCUMENTS

CN  1518809 A  8/2004

(Continued)

OTHER PUBLICATIONS

Larsson, et all, "An Algorithm for Joint Symbol Timing and Channel Estimation for OFDM Systems," Proceedings for the 11th IEEE Signal Processing Workshop on Statistical Signal Processing, 2001. Aug. 6-8, 2001, Piscataway, NJ, pp. 393-396.

(Continued)

*Primary Examiner* — Ricky Ngo
*Assistant Examiner* — Rasheed Gidado
(74) *Attorney, Agent, or Firm* — Gerald P. Joyce, III

(57) ABSTRACT

Apparatus and methods are provided for making timing adjustments in a multi carrier communications system. In an aspect, a timing correction method is provided for a multi-carrier system. This includes adjusting the time basis of two or more pilot interlaces with respect to each other in order to account for timing differences between the interlaces when combining the interlaces, and then adjusting or matching the time bases of the combined interlaces with a symbol to be demodulated. The alignment and matching is performed in order to generate channel estimates for data demodulation. The channel estimates, thus generated, along with the timing alignment information are in turn used for determining timing corrections to be applied to demodulation of a particular symbol. Corresponding apparatus are also disclosed that implement the methodology.

30 Claims, 9 Drawing Sheets

U.S. PATENT DOCUMENTS

| | | | |
|---|---|---|---|
| 7,167,456 B2 | 1/2007 | Iwamatsu et al. | |
| 7,239,203 B2 | 7/2007 | Shanbhag | |
| 7,292,651 B2 | 11/2007 | Li | |
| 7,372,893 B2 | 5/2008 | Park et al. | |
| 7,463,691 B2 | 12/2008 | Tao et al. | |
| 7,548,594 B2 | 6/2009 | Wang | |
| 7,616,553 B2 | 11/2009 | Marchok | |
| 7,627,067 B2 | 12/2009 | Coulson | |
| 7,656,844 B2 | 2/2010 | Hayashi | |
| 7,680,094 B2 | 3/2010 | Liu | |
| 7,701,917 B2 | 4/2010 | Mantravadi et al. | |
| 2003/0058365 A1 | 3/2003 | MacInnis et al. | |
| 2004/0062215 A1 | 4/2004 | Sato | |
| 2005/0002478 A1 | 1/2005 | Agami et al. | |
| 2005/0099230 A1 | 5/2005 | Shanbhag | |
| 2005/0135432 A1 | 6/2005 | Kelley et al. | |
| 2005/0141657 A1 | 6/2005 | Maltsev et al. | |
| 2005/0163257 A1 | 7/2005 | Keerthi | |
| 2005/0176436 A1 | 8/2005 | Mantravadi et al. | |
| 2005/0195763 A1 | 9/2005 | Kadous et al. | |
| 2005/0249181 A1* | 11/2005 | Vijayan et al. | 370/344 |
| 2006/0104380 A1 | 5/2006 | Magee et al. | |
| 2006/0215539 A1* | 9/2006 | Vrcelj et al. | 370/208 |
| 2006/0227812 A1* | 10/2006 | Vrcelj et al. | 370/503 |
| 2006/0285599 A1* | 12/2006 | Seki et al. | 375/260 |
| 2007/0023063 A1 | 2/2007 | Deuel | |
| 2007/0230635 A1 | 10/2007 | Wilhelmsson et al. | |

FOREIGN PATENT DOCUMENTS

| | | |
|---|---|---|
| EP | 1737173 | 12/2006 |
| KR | 20010108236 | 12/2001 |
| WO | 01059980 | 8/2001 |

OTHER PUBLICATIONS

Li, et al., "Robust Channel Estimation for OFDM Systems with Rapid Dispersive Fading Channels," IEEE Transactions on Communications, vol. 46, Issue 7, Jul. 1998, pp. 902-915.

Linde, "An AGC Strategy for Adaptive Digital Modems in Frequency Hopping Applications," Southern African Conference on Communications and Signal Processing, 1989. COMSIG 1989. Jun. 23, 1989, Stellenbosch, South Africa, pp. 19-24.

Wang, et al., "Performance of Linear Interpolation-Based MIMO Detection for MIMO-OFDM Systems," 2004 IEEE Wireless Communications and Networking Conference, WCNC. Mar. 21-25, 2004. Atlanta, GA, vol. 2, pp. 981-986.

International Search Report—PCT/US08/055797, International Search Authority—European Patent Office, Jul. 10, 2008.

Written Opinion—PCT/US08/055797, International Search Authority—European Patent Office, Jul. 10, 2008.

* cited by examiner

TIMING ADJUSTMENTS FOR CHANNEL ESTIMATION IN A MULTI CARRIER SYSTEM

CLAIM OF PRIORITY UNDER 35 U.S.C. §119

The present Application for Patent claims priority to Provisional Application No. 60/893,058 entitled "TIMING ADJUSTMENTS FOR CHANNEL ESTIMATION IN A MULTI CARRIER SYSTEM" filed Mar. 5, 2007, and Provisional Application No. 60/893,060 entitled "APPARATUS AND METHODS ACCOUNTING FOR AUTOMATIC GAIN CONTROL IN A MULTI CARRIER SYSTEM" filed Mar. 5, 2007, and assigned to the assignee hereof and hereby expressly incorporated by reference herein.

REFERENCE TO RELATED APPLICATIONS FOR PATENT

The present Application for Patent is related to the following co-pending U.S. patent applications Ser. No.:

"TIMING CORRECTIONS IN A MULTI CARRIER SYSTEM AND PROPAGATION TO A CHANNEL ESTIMATION TIME FILTER" by Bojan Vrcelj et al., having a U.S. patent application Ser. No. 11/373,764, filed Mar. 9, 2006, assigned to the assignee hereof, and expressly incorporated by reference herein; and "APPARATUS AND METHODS ACCOUNTING FOR AUTOMATIC GAIN CONTROL IN A MULTI CARRIER SYSTEM" by Matthias Brehler, having a U.S. patent application Ser. No. 11/777,263, filed Jul. 12, 2007, assigned to the assignee hereof, and expressly incorporated by reference herein.

BACKGROUND

1. Field

The present disclosure relates to timing adjustments for channel estimation in a multi carrier wireless system, and, more particularly, to adjusting timing by ensuring pilot tone interlaces have matching time bases, which also match a symbol time basis.

2. Background

Orthogonal frequency division multiplexing (OFDM) is a method of digital modulation in which a signal is split into several narrowband channels at different carrier frequencies orthogonal to one another. These channels are sometimes called subbands or subcarriers. In some respects, OFDM is similar to conventional frequency-division multiplexing (FDM) except in the way in which the signals are modulated and demodulated. One advantage of OFDM technology is that it reduces the amount of interference or crosstalk among channels and symbols in signal transmissions. Time-variant and frequency selective fading channels, however, present problems in many OFDM systems.

In order to account for time varying and frequency selective fading channels, channel estimation is used. In coherent detection systems, reference values or "pilot symbols" (also referred to simply as "pilots") embedded in the data of each OFDM symbol may be used for channel estimation. Time and frequency tracking may be achieved using the pilots in channel estimation. For example, if each OFDM symbol consists of N number of subcarriers and P number of pilots, then an N-P number of the subcarriers can be used for data transmission and P number of them can be assigned to pilot tones. These P number of pilots are sometimes uniformly spread over the N subcarriers, so that each two pilot tones are separated by N/P-1 data subcarriers (or, in other words, each pilot occurs every $N/P^{th}$ carrier). Such uniform subsets of subcarriers within an OFDM symbol and over a number of symbols occurring in time are called interlaces.

In one area of application, OFDM has also been used in Europe and Japan, as examples, for digital broadcast services, such as with the Digital Video Broadcast (DVB-T/H (terrestrial/handheld)) and Integrated Service Digital Broadcast (ISDB-T) standards. In such wireless communication systems, channel characteristics in terms of the number of channel taps (i.e., the number of samples or "length" of a Finite Impulse Response (FIR) filter that is used to represent the channel of a received signal) with significant energy, path gains, and the path delays are expected to vary quite significantly over a period of time. In an OFDM system, a receiver responds to changes in the channel profile by selecting the OFDM symbol boundary appropriately (i.e., correction of window timing) to maximize the energy captured in a fast Fourier transform (FFT) window.

When timing corrections take place, it is important that the channel estimation algorithm takes the timing corrections into account while computing the channel estimate to be used for demodulating a given OFDM symbol. In some implementations, the channel estimate is also used to determine timing adjustment to the symbol boundary that needs to be applied to future symbols, thus resulting in a subtle interplay between timing corrections that have already been introduced and the timing corrections that will be determined for the future symbols. Further, it is common for a channel estimation block in a receiver to buffer and then process pilot observations from multiple OFDM symbols, which results in a channel estimate that has better noise averaging and resolves longer channel delay spreads. This is achieved by combining the channel observations from consecutively timed OFDM symbols into a longer channel estimate in a unit called the time filtering unit. Longer channel estimates in general may lead to more robust timing synchronization algorithms. When pilot observations from multiple OFDM symbols are processed together to generate a channel estimate, however, if the interlaces combined and the OFDM symbols to be demodulated are not aligned with respect to the symbol timing (i.e., have the same timebasis), the channel estimation may become degraded to the point that it cannot be used for successful symbol demodulation.

SUMMARY

According to an aspect of the present disclosure, a method for timing correction in a communication system is disclosed. The method includes adjusting time bases of one or more pilot interlaces and combining the one or more pilot interlaces. The method further includes matching the time basis of the combined pilot interlaces with a symbol to be demodulated, and then obtaining a corrected channel estimate based on combined pilot interlaces having a time basis matching the symbol.

According to another aspect of the present disclosure, a processor for use in a wireless transceiver is disclosed. In particular, the processor is configured to adjust time bases of one or more pilot interlaces and combine the one or more pilot interlaces. The processor also matches the time basis of the combined pilot interlaces with a symbol to be demodulated, and obtains a corrected channel estimate based on combined pilot interlaces having a time basis matching the symbol.

According to still another aspect of the present disclosure, a transceiver for use in a wireless system is disclosed. The transceiver includes a channel estimation unit configured to adjust time bases of one or more pilot interlaces and combine the one or more pilot interlaces, match the time basis of the combined pilot interlaces with a symbol to be demodulated, and obtain a corrected channel estimate based on combined pilot interlaces having a time basis matching the symbol. The transceiver also includes a timing tracking unit configured to set timing of a discrete Fourier transform unit based on the corrected channel estimate.

According to yet another aspect of the present disclosure, an apparatus for use in a wireless transceiver is disclosed. The apparatus includes means for adjusting time bases of one or more pilot interlaces to a common time base and combining the one or more pilot interlaces, means for aligning the time basis of the combined pilot interlaces with a symbol to be demodulated, and means for obtaining a corrected channel estimate based on combined pilot interlaces having a time basis matching the symbol.

According to another aspect of the present disclosure, a computer program product is disclosed. The computer program product comprises a computer-readable medium having a code for adjusting time bases of one or more pilot interlaces and combining the one or more pilot interlaces. The computer-readable medium also includes code for instruction for matching the time basis of the combined pilot interlaces with a symbol to be demodulated, and code for obtaining a corrected channel estimate based on combined pilot interlaces having a time basis matching the symbol.

DETAILED DESCRIPTION

The present disclosure discusses apparatus and method for determining timing adjustments for channel estimation and timing tracking in a multi carrier system.

Figure 1:
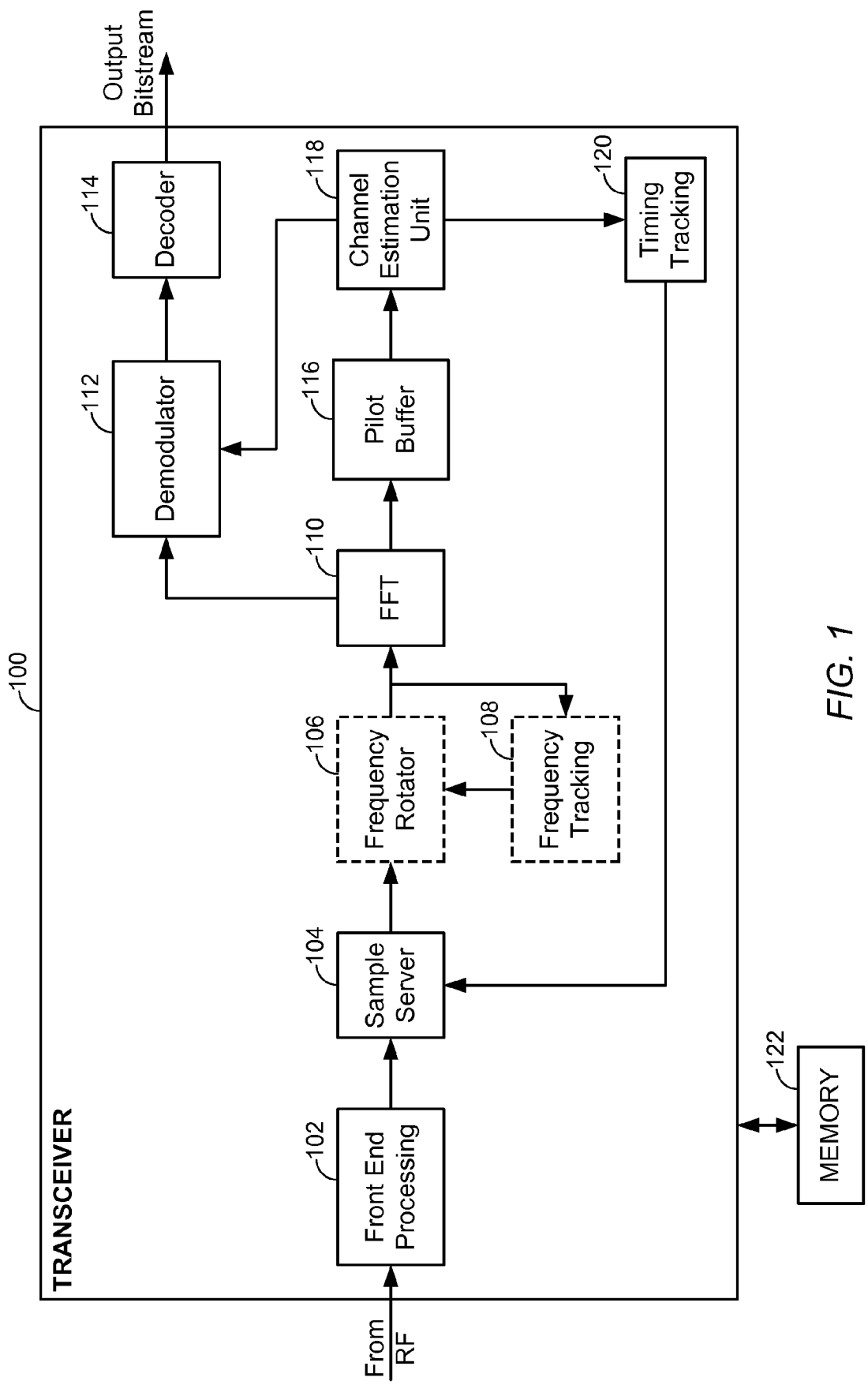
FIG. 1 illustrates a block diagram of an exemplary transceiver according to the present disclosure.

FIG. 1 illustrates a block diagram of an exemplary OFDM transceiver or portion of a transceiver according to the present disclosure. The system of FIG. 1, in particular, may employ the disclosed techniques for making timing adjustments using pilot tones, which are used for channel estimation. The system 100, which may be a transceiver or one or more processors, hardware, firmware, or a combination thereof, receives a transmitted RF signal as shown. A front end processing block 102 receives the RF signal and performs various processing functions including analog-to-digital conversion, down conversion, and AGC (Automatic Gain Control). After front end processing, the resultant signals are sent to a sample server 104, which effects the actual timing window (e.g., the FFT timing window) for sampling the subcarriers within the signal. The output of the sample server 106, which is a synchronized digital signal, then is input to an optional frequency rotator 106. The optional frequency rotator 106 operates in conjunction with and under control of a frequency tracking block 108 to cause rotation or shifting of the phase of the signal in frequency in order to make fine adjustments or corrections in frequency.

The signals from either sample server 104 or frequency rotator 106, if utilized, are sent to a fast Fourier Transform (FFT) 110, which performs a discrete Fourier transform of the signal. More particularly, the FFT 110 extracts the data carriers and the pilot carriers. The data is sent to a demodulator 112 for demodulation of the data, and a subsequent decoder 114 for decoding of the data according to any suitable encoding scheme utilized. The output of the decoder is a bit stream for use by other processors, software, or firmware within a transceiver device.

The pilot tones extracted by FFT 110 are sent to a pilot buffer 116, which buffers a number of pilot interlaces from one or more OFDM symbols. According to an example disclosed herein, the buffer 116 may be configured to buffer seven (7) pilot interlaces for use in combining the interlaces for DVB-T/H or ISDB-T systems, which will be discussed in further detail later. The buffered pilot interlaces are delivered by buffer 116 to a channel estimation unit or block 118, which estimates the channels using the interlaced pilot tones inserted by the transmitter (not shown) into the symbols of the digital signal. As will be discussed further, the channel estimation yields a channel impulse response (CIR) $\hat{h}_{k,n}$ to be used in timing tracking and a channel frequency response $\hat{H}_{k,n}$ to be used for demodulation of the channel data by demodulator 112. The channel impulse response (CIR) $\hat{h}_{k,n}$, in particular, is delivered to a timing tracking unit or block 120, which effects a timing tracking algorithm or method to determine a timing decision for the FFT window that is used by sample server 104.

Figure 2:
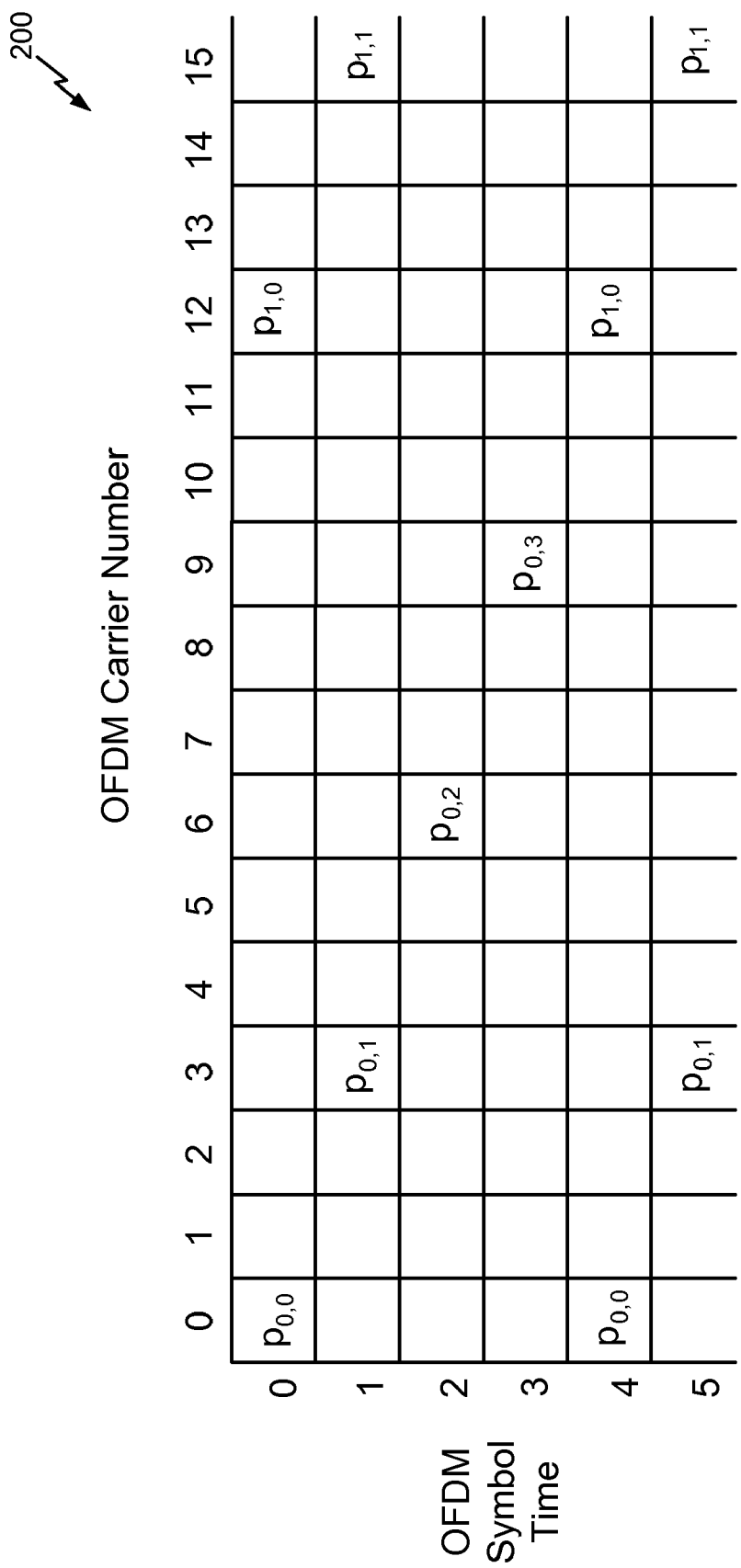
FIG. 2 is a diagram of an exemplary pilot tone staggering scheme used in particular OFDM standards.

As mentioned above, in a transceiver used in an OFDM system, a channel estimation unit (e.g., 118) is utilized to obtain a channel transfer function estimate $\hat{H}_{k,n}$ of the channel at each carrier k and OFDM symbol time n for demodulation of the data symbols and an estimate $\hat{h}_{k,n}$ of the corresponding channel impulse response (CIR) for use in time tracking. In both DVB-T/H and ISDB-T systems, in particular, the pilot tones are transmitted according to a predetermined interlace staggering scheme 200 as illustrated by FIG. 2, which illustrates the scheme for the first few carriers k and symbol times n. As may be seen in FIG. 2, at a given symbol time n, pilot tones p are inserted at every $12^{th}$ carrier for a total of up to $N_K/12$ pilots tones per OFDM symbol n (e.g., at symbol time 0 in FIG. 3 there can be a $N_K/12$ number of pilot tones where carrier 0 is used for a pilot tone, but $N_K/12-1$ for symbols having pilots staggered such as a OFDM symbol time 1, 2, and 3 in FIG. 2), where $N_K$ is the total number of carriers. For subsequent symbols, insertion of pilot tones is offset by 3×(n mod4) tones, based from time 0 (n=0). Accordingly, in symbol 1 the first pilot tone is inserted at carrier 3, in symbol 2 the first pilot tone is inserted at carrier 6, and so forth. As further illustrated, pilot tones $p_{l,m}$ are inserted every $l^{th}$ carrier for a respective interlace m, where l is equal to 12 in this example, and m=mod4 (i.e., $0 \leq m \leq 3$), where mod signifies a modulo operation. Thus, after four OFDM symbols (e.g., OFDM symbol times 0-3), the pattern repeats. For example, FIG. 2 illustrates for the first pilot (i.e., l=0), the interlace pattern is staggered for m=0 to 3, as may be seen by the four pilots $p_{0,0}$, $p_{0,1}$, $p_{0,2}$, and $p_{0,3}$ inserted in symbols 0, 1, 2, and 3, respectively.

Figure 3:
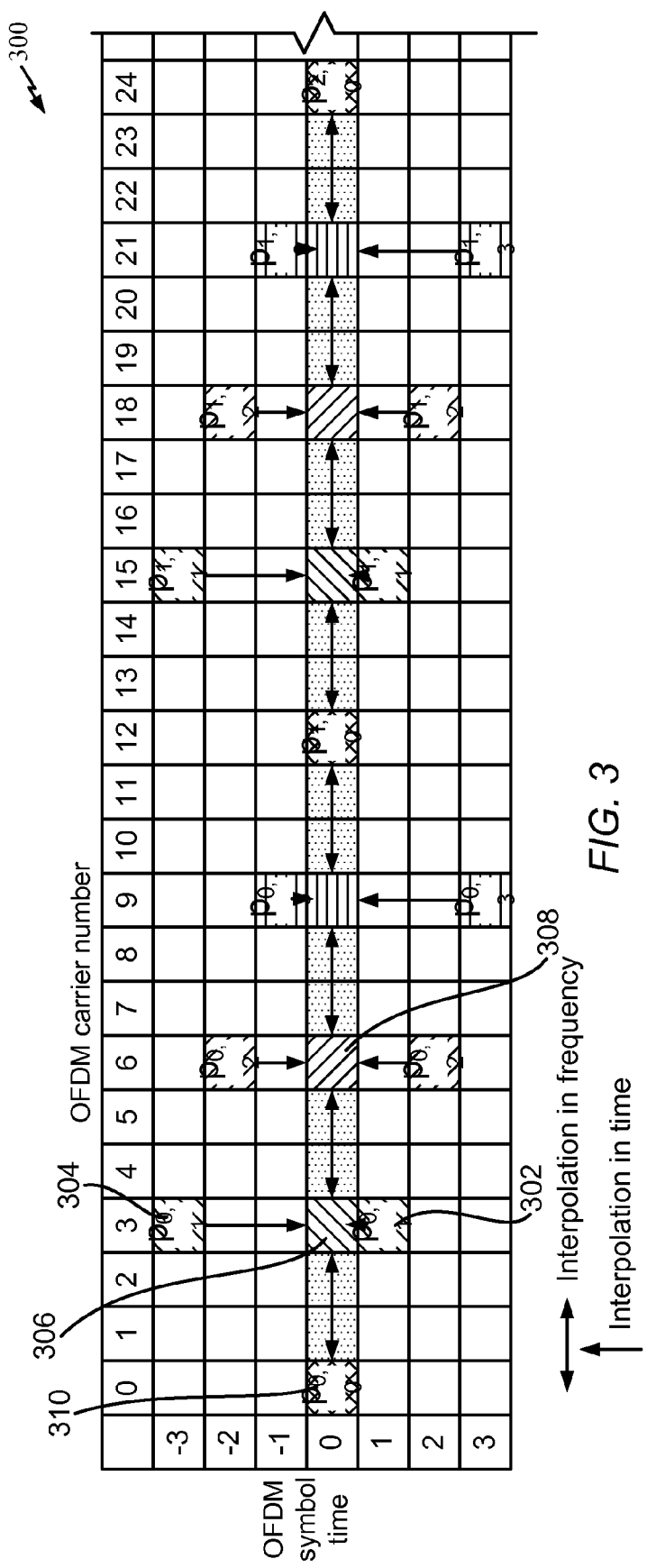
FIG. 3 is a diagram of a visualization of combining pilot tone of the exemplary pilot tone staggering scheme of FIG. 2.

As an example, known channel estimation algorithms in systems employing the interlace illustrated in FIG. 2 typically combine pilot interlaces from seven (7) consecutive OFDM symbols, which are buffered in a pilot interlace buffer (not shown), in a paired fashion to find a channel estimate for a time n. In particular, each pair of pilot tones corresponds to the same pilot (i.e., $l^{th}$ pilot) at different OFDM symbol time instances and they are combined to estimate the channel corresponding to the time of data. As an example of such combining, FIG. 3 illustrates a diagram 300 of the exemplary interlacing of pilot symbols p shown in FIG. 2 with further visual representation of the combining of pilot tones. As illustrated, a first pilot $p_{l,m}$ for l=0, for example, is combined in time for each of the carriers (i.e., interpolated in time). As may be seen in FIG. 3, a pair 302, 304 of pilots ($p_{0,1}$) at carrier 3 (i.e., an offset of 3 carriers (3×n mod4), thus part of same m+1 interlace) and times n+1 and n−3, respectively, are combined to the time of symbol time n (n being 0 in this example) as indicated with vertical arrows. Additionally, an interpolated pilot tone 306 may then be interpolated in frequency with other interpolated pilot tones 308 or a pilot tone extant in the n time OFDM symbol 210, as illustrated by the horizontal arrows in FIG. 3.

Combining pilot tones may be effected using any known techniques including interpolation techniques. It is further noted that the interlaces may be combined in the frequency or time domain, as will be explained in detail below. From a theoretical point of view, both strategies of combining (frequency or time domain) yield the same performance. It is noted, however, that combining in time may present less stress on a channel IFFT in a fixed point implementation (since its shorter).

In utilizing the pilot scattering scheme illustrated in FIGS. 2 and 3, available scattered pilot tone positions are used for combining of pilot tones. As a result, the channel impulse response (CIR) covers ⅓ of the useful OFDM symbol time (⁴⁄₃ of the maximum guard).

A first strategy for combing pilot tones of the interlaces is combining in the frequency domain, as mentioned above, using a filter. Combining the pilot tones in the frequency domain can be mathematically expressed as shown in equation (1) below providing the pilot tone estimate $\overline{H}_{k,n}$:

$$\overline{H}_{k,n} = \sum_{l=-\lceil N_c/4 \rceil}^{\lceil N_{nc}/4 \rceil} m_{l,[n-k]_4} P_{[k/4],[n-([n-k]_4-l\cdot 4)]_4}, \quad 0 \le k < N_P, \quad (1)$$

In equation (1) above, $N_P$ is the length of the final time-domain channel estimate, $m_{l,[n-k]_4}$ are the filter coefficients of the filter, and $N_c$ and $N_{nc}$ are the causal and non-causal filter lengths, respectively. It is noted that the notation $[\;]_4$ is an abbreviated notation where the subscript 4 is a reminder of the modulo operation xmod4. For simplicity only filtering of pilot tones corresponding to the same interlace as the filter output is allowed. In other words, the filter works vertically as indicated in FIG. 3 for the presently disclosed example where $N_c = N_{nc} = 3$. According to this example, the filter coefficients $m_{l,[n-k]_4}$ are chosen to effect linear interpolation between two pilot-tones and are shown in Table 1 below. As may be seen in the table, the filter coefficients effectively weigh the effect that those tones closer to carrier 0 (e.g., k=1), in this example, are given more weight than those tones (e.g., k=3) farther away in frequency.

TABLE 1

Filter coefficients for linear interpolation

| | k | | | |
|---|---|---|---|---|
| | 0 | 1 | 2 | 3 |
| $m_{0,k} =$ | 1 | 0.75 | 0.5 | 0.25 |
| $m_{1,k} =$ | 0 | 0.25 | 0.5 | 0.75 |

It is noted that a more general filter could incorporate pilot tones from other interlaces (i.e., also work diagonally), with an according increase in complexity. After filtering the IFFT of the $\overline{H}_{k,n}$ is taken, taps below a certain threshold are set to zero, and after zero-padding with $2N_P$ zeros (to interpolate in frequency), an FFT is taken to arrive at the final channel estimate $\hat{H}_{k,n}$, where $N_P$ is the length of the final time-domain channel estimate.

While combining the interlaces in frequency domain, as discussed above, is straightforward, another strategy is to combine interlaces in the time domain, as was contemplated in U.S. patent application Ser. No. 11/373,764, expressly incorporated by reference herein, for a forward link only (FLO) system. In a present example, the same time domain combining can be done for DVB-T/H and ISDB-T OFDM systems, for example. Due to the four (4) interlaces in the DVB-T/H and ISDB-T systems (see e.g., FIGS. 1 and 2), however, the mechanics are slightly different than a FLO system where only two (2) interlaces are used to obtain the "actual" and "excess" channel taps. In the present example, 4 different interlaces, such as are used in DVB-T/H and ISDB-T systems, are used to obtain 4 segments of the complete channel impulse response (CIR).

First, an IFFT of the pilot tones of each interlace is taken. More specifically, zero-padding (i.e., extending a signal (or spectrum) with zeros to extend the time (or frequency band) limits) of the $$\frac{N_K}{12} \left(\text{or } \frac{N_K}{12} + 1 \text{ for interlace } 0\right)$$

pilot tones $P_{l,m}$ to $N_{IL}$ is performed, where $N_K$ represents the number of carriers, and $N_{IL}$ represents the length of interlaces in frequency after zero padding. In DVB-H systems, for example, the number of carriers $N_K$ is 1705, 3409, or 6817 dependent on the mode of operation. ISDB-T segment-0 systems as a further example typically have 108, 216, or 432 carriers $N_K$ dependent on the mode of operation. In DVB-H systems, for example, the length of the interlaces $N_{IL}$ are 256 or 512 or 1024, dependent on the mode of operation. ISDB-T systems, as another example, would have interlaces lengths of 16 or 32 or 64 dependent on the mode of operation. After zero padding of the $$\frac{N_K}{12}$$

tones, an IFFT is taken to obtain a time-domain estimate $\tilde{h}_{k,n}$ of the channel per interlace, governed by the following equation (2):

$$\tilde{h}_{k,n} = \frac{1}{N_{IL}} \sum_{l=0}^{L} P_{l,[n]_4} e^{j\frac{2\pi}{N_{IL}}lk}, \quad (2)$$

$$L = \frac{N_K}{12} \text{ for } m = 0,$$

$$L = \frac{N_K}{12} - 1 \text{ for } m \neq 0$$

In preparation to combine the time-domain interlace channel estimates having a length $N_{IL}$ to a channel estimate with length $N_P$ (where $N_P = 4 N_{IL}$), the phases of the $\tilde{h}_{k,m}$ need to be adjusted. Accordingly, the channel estimate is adjusted according to the following equation (3):

$$b_{k,n} = e^{j\frac{2\pi}{N_P}[n]_4 k} \tilde{h}_{k,n}, \, 0 \le k \le N_{IL} - 1. \quad (3)$$

where $b_{k,m}$ are referred to as the interlace buffers. Because each interlace channel estimate is to be used four (4) times for the calculation of channel estimates at consecutive OFDM symbol times, the $b_{k,m}$ are buffered, requiring $7N_{IL}$ complex storage spaces for the presently disclosed examples.

Figure 4:
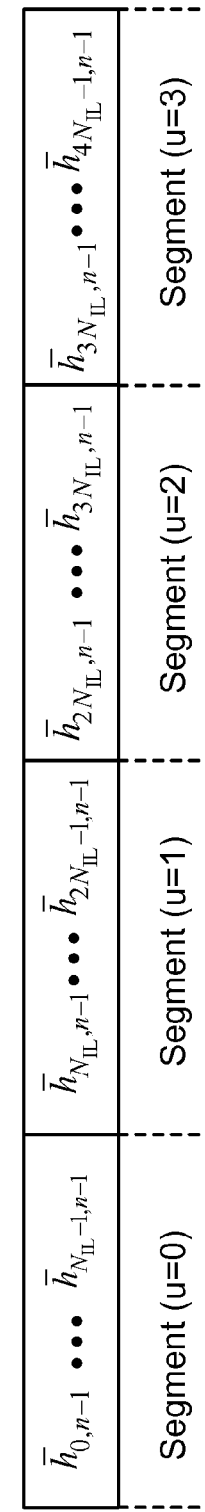
FIG. 4 illustrates a time-domain channel estimate split into four segments according to an exemplary method for combining interlaces.

The interlace buffers can be combined to form a time-domain channel estimate $\overline{h}_{k,n}$ having a length of $N_P = 4N_{IL}$. The channel estimate $\overline{h}_{k,n}$ may then be split into four segments as illustrated in FIG. 4. Each of the four u segments has a length of $N_{IL}$, where each of the segments u can be obtained from the buffers as proved by the following relationship:

$$\overline{h}_{k+uN_{IL},n} = \frac{1}{4} \sum_{l=-N_c}^{N_{nc}} m_{[l/4],[-l]_4} e^{j\frac{\pi}{2}[n+l]_4 u} b_{k,n+1}, \, 0 \le k \le N_{IL} - 1, \, 0 \le u \le 3 \quad (4)$$

Figure 5:
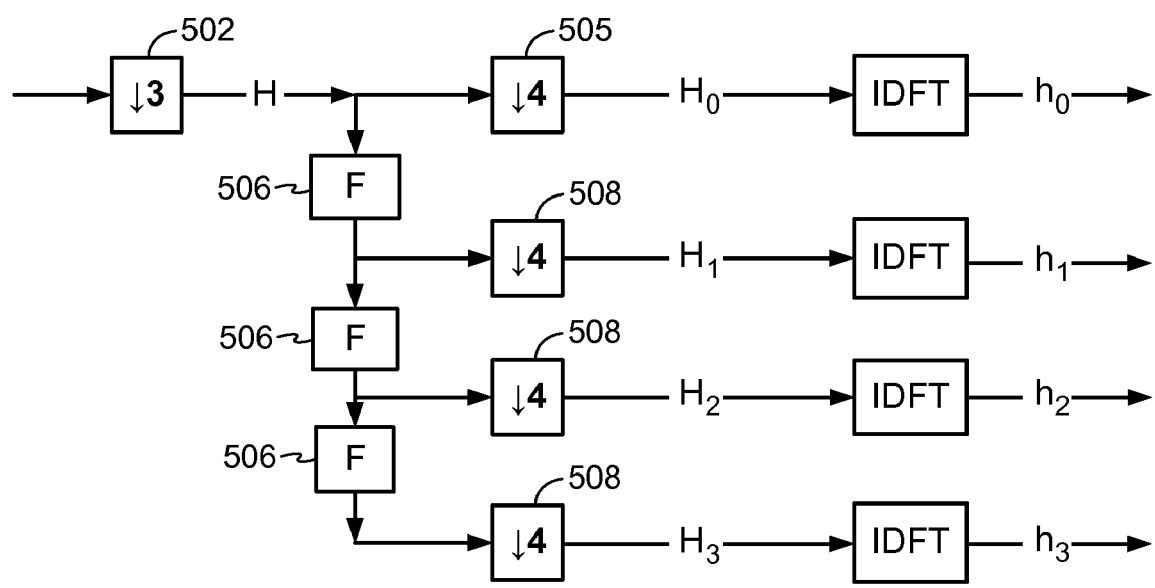
FIG. 5 illustrates an exemplary conceptual signal processing view of generating interlaces.

For the same filter coefficients $m_{l,k}$ the time-domain channel taps obtained here are simply the IFFT of the combined pilot tones of equation (1) above. Combining in the time domain may simply be viewed as one way of implementing a fast algorithm for the discrete Fourier transform (DFT) of the pilot tones combined in frequency. More particularly, the equivalence is derived as follows for the case that we use exactly four consecutive interlaces and all 4 filter coefficients $m_{l,k}$ are one (a more general case with filtering will be considered later). Then each time interlace $\tilde{h}_{k,m}$ can be viewed as being obtained from a frequency-domain channel $\overline{H}_{k,n}$ by down-sampling and advancing (in frequency). FIG. 5 illustrates the down-sample and advance operation that can be thought of as generating the $\tilde{h}_{k,m}$ in a conceptual signal processing view.

As illustrated in FIG. 5, the channel sampled at every carrier frequency is input and first down-sampled by 3 at block 502 (corresponding to a pilot every 3 tones, if all interlaces are combined), and further down-sampled by 4 (block 504) for interlace 0.

For the other interlaces, the frequency indices are shifted by one (the F operator in block 506 signifies a forward shift) and then down-sampled by 4 as illustrated by blocks 508. Since down-sampling in frequency corresponds to aliasing in time and shifting in frequency to a phase shift in time one skilled in the art will appreciate that the following relationship in equation (5) below governs.

$$\tilde{h}_{k,n} = \sum_{l=0}^{3} e^{-j\frac{2\pi}{N_P}[n]_4(k-lN_{IL})} \overline{h}_{k+lN_{IL},n}. \quad (5)$$

For the sake of the present derivation of time domain interlace combining, it is assumed that the channel is constant. Thus, to obtain the $\overline{h}_{k+uN_{IL},n}$ back from the interlaces $\tilde{h}_{k,n}$, coefficients $\alpha_{kmu}$ can be found according to equation (6) as follows:

$$\sum_{m=0}^{3} \alpha_{kmu} \tilde{h}_{k,n-m} = \overline{h}_{k+uN_{IL},n}. \quad (6)$$

which may be achieved if:

$$\sum_{m=0}^{3} \alpha_{kmu} e^{-j\frac{2\pi}{N_P}m(k+lN_{IL})} = \delta(l-u) \quad (7)$$

$$\forall \, 0 \le k \le N_{IL} - 1,$$

which ensures that in the linear combination of equation (6) that the coefficients in front of $\overline{h}_{k+uN_{IL},n-m}$ sum up to unity and for all other aliases the coefficients sum up to zero. As one skilled in the art will recognize, the solution for $\alpha_{kmu}$ is thus $$\alpha_{kmu} = \frac{1}{4} e^{+j\frac{2\pi}{N_P}mk} e^{+j\frac{2\pi}{N_P}muN_{IL}}. \quad (8)$$

By further recognizing that that the ratio $$\frac{N_{IL}}{N_P} = \frac{1}{4},$$

the deramping and interlace buffer combining coefficients can be extracted from this solution.

The additional filtering introduced with the coefficients $m_{l,k}$ can be viewed to only operate on a given interlace, so that it is equivalent in time and frequency domain (i.e., linear operations are interchangeable). Whether the filtered interlaces are then combined in frequency or time domain is the same according to the presently disclosed methodologies. Accordingly, equation (4) above can be rewritten as the following equation (9):

$$\overline{h}_{k+uN_{IL},n} = \frac{1}{4} \sum_{r=0}^{3} e^{j\frac{\pi}{2}[n-r]_4 u} e^{j\frac{2\pi}{N_P}[n-r]_4 k} \sum_{l=-\lceil N_c/4 \rceil}^{\lceil N_{nc}/4 \rceil} m_{l,r} \tilde{h}_{k,n-(r-l\cdot 4)}, \quad (9)$$

where the inner sum corresponds to the interlace filtering and the outer-sum corresponds to the phase deramping and interlace combining in time domain.

When combining interlaces, whether in frequency or time domain, certain timing adjustments are necessitated due to phase shift between pilot tones at a current n OFDM symbol and previous interlaces. Known fine timing tracking algorithms, for example, retard or advance the position of the FFT window at a sample server (to be discussed later). These timing adjustments correspond to phase shifts in the frequency-domain and thus affect channel estimation: The pilot tones at time n have a phase shift compared with the previous interlaces. Thus, channel estimation should be configured to correct for this phase shift to combine the interlace buffers. The advance or retarding of the FFT window may be also referred to as an advance or retard of the sampling of the OFDM symbol.

Figure 6:
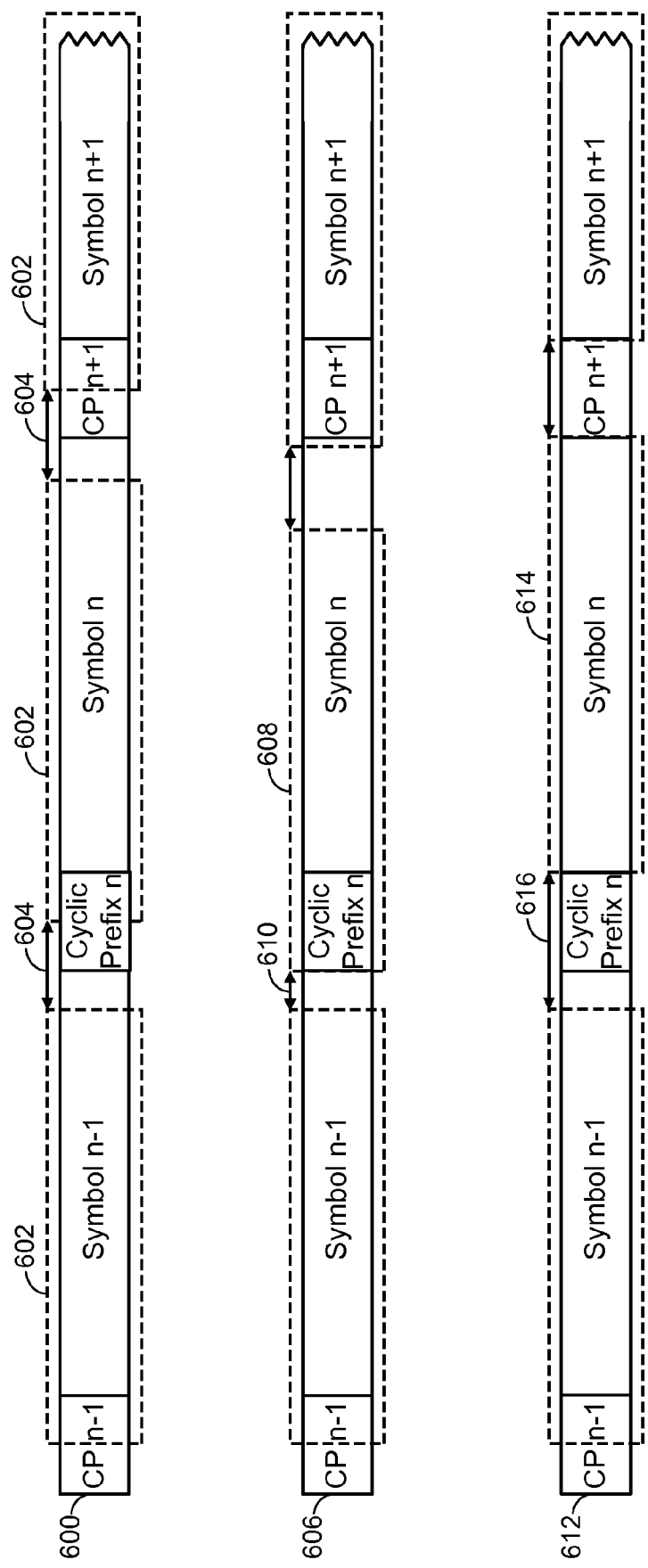
FIG. 6 illustrates FFT timing windows for three different timing occurrences in a transceiver.

More particularly, known fine-time tracking algorithms advance or retard the position of the FFT window at time n by a variable, termed herein as $ADV\_RET_n$, where $ADV\_RET_n<0$ corresponds to an advance of the FFT window and $ADV\_RET>0$ to a delay of the FFT window. As an example, FIG. 6 illustrates three different FFT window position scenarios for a particular string of three consecutive OFDM symbols (n−1, n, n+1). The first scenario indicated by reference number 600, shows timing windows 602 where the timing between windows shown by arrow 604, is essentially constant with no change from one symbol (i.e., n−1) to the next (n).

Assuming no change in the underlying channel, an advance of the FFT window, however, leads to a delay of the channel. As an example, the second scenario 606 in FIG. 6 illustrates that the FFT window 608 is advanced as indicated by shortened arrow 610, thus causing the samples in the window to be delayed. Correspondingly, a delay of the FFT window leads to an advance of the channel as illustrated by scenario 612, where the window 614 is delayed as indicated by longer arrow 616.

Because of the opposite effect of the adjustments to the FFT window towards the channel, a timing adjustment is defined by $a_n=-ADV\_RET_n$. Accordingly, when the FFT window is advanced the (channel/signal) samples within the window are cyclically shifted to the right, which corresponds to a delay for the channel. On the other hand, when the FFT window is delayed the samples within the window are cyclically shifted to the left, which corresponds to an advance of the channel.

A timing adjustment by $a_n$ at symbol time n leads to a phase shift in frequency, i.e., with no other changes in the channel the true channel tones at time n can be represented by:

$$H_{k,n} = e^{-j\frac{2\pi}{N_{RX\_FFT}}a_n k} e^{+j\frac{2\pi}{N_{RX\_FFT}}a_n \lfloor \frac{N_K}{2} \rfloor} H_{k,n-1}, \quad (10)$$

where the second phase term $$\left( e^{+j\frac{2\pi}{N_{RX\_FFT}}a_n \lfloor \frac{N_K}{2} \rfloor} \right)$$

arises due to the particular carrier arrangement of the preset disclosure because in the channel estimation the "true" DC term shows up at $$k = \left\lfloor \frac{N_K}{2} \right\rfloor.$$

Figure 7:
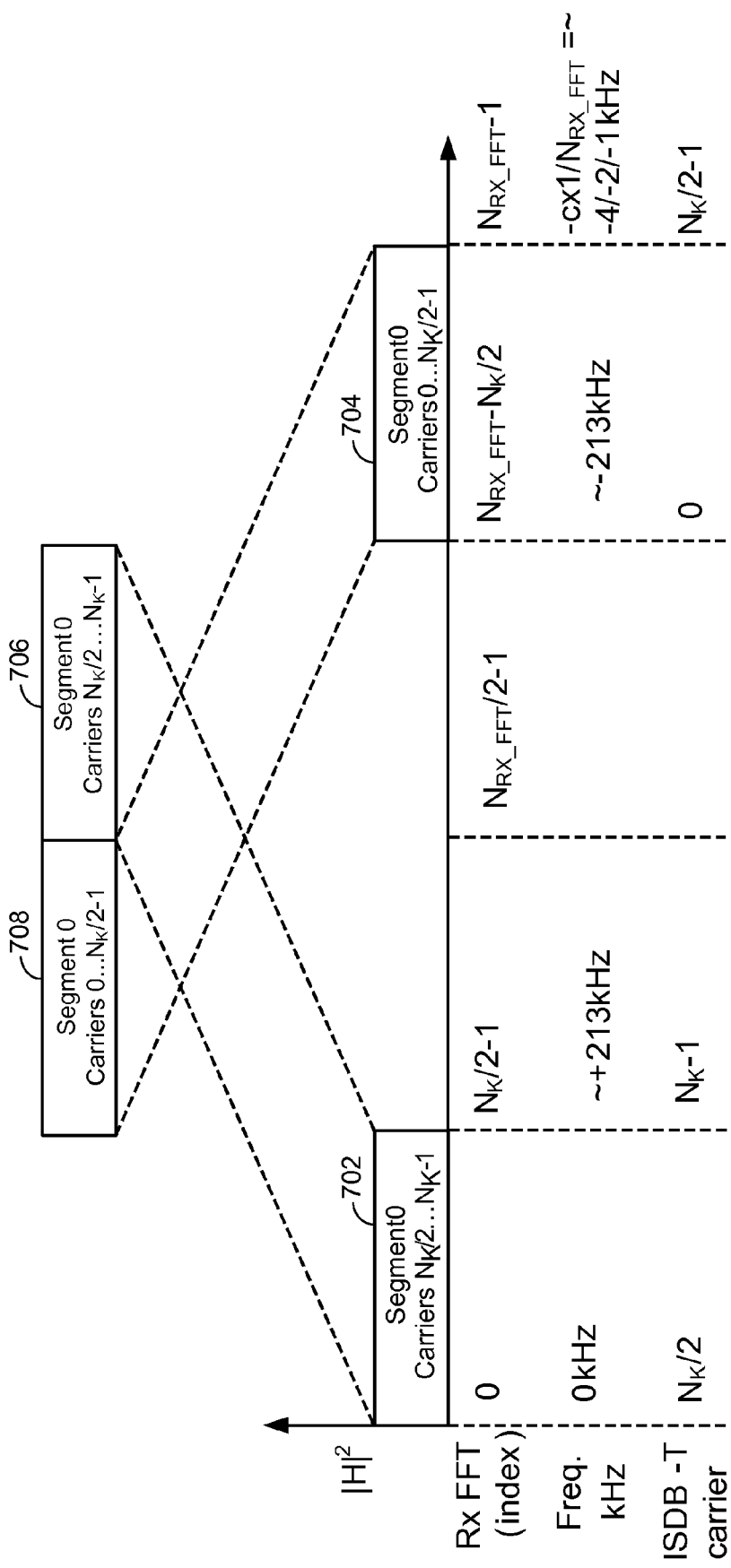
FIG. 7 illustrates an arrangement of carriers and mapping of those carriers for ISDB-T system in accordance with the present disclosure.

As a visual example, FIG. 7 illustrates an exemplary carrier arrangement in the ISDB-T standard (which would also be similarly arranged for DVB-T/H), where an FFT shift is performed by multiplying the input with ±1 sequence.

In particular, the phase shift initially shows up in the front-end FFT, where the carriers of interest are located at $$\left[ 0 \ldots \left\lceil \frac{N_K}{2} \right\rceil - 1 \right] \text{ and } \left[ N_{RX\_FFT} - \left\lfloor \frac{N_K}{2} \right\rfloor \ldots N_{RX\_FFT} - 1 \right],$$

($N_{Rx\_FFT}$ being the size of the front-end FFT). These may be seen in FIG. 7 as 702 and 704, respectively. For channel estimation and demodulation, the upper indices of the front-end FFT are mapped to $$\left[ 0 \ldots \left\lceil \frac{N_K}{2} \right\rceil - 1 \right],$$

as illustrated by 706, and the lower ones mapped to $$\left[ \left\lfloor \frac{N_K}{2} \right\rfloor \ldots N_K - 1 \right],$$

as illustrated by 708, with 0 of the front-end FFT corresponding to $$\left\lfloor \frac{N_K}{2} \right\rfloor.$$

Since the front end FFT DC carrier (carrier 0 in the presently disclosed numbering) does not see any phase phase-shift, a correction with the additional phase-shift for the carrier arrangement used in demodulation/channel estimation is needed. By mapping in this manner, memory storage space is reduced, making storage easier. It is noted that this implementation is merely exemplary and that other implementations could have the DC carrier in a different location.

A consideration with timing updates and channel estimation is that the interlaces that are combined by the channel estimation algorithm need to have the same time-basis. If the interlaces that are combined do not have the same time-basis, for example, the resulting channel estimate is severely degraded, to the point that it cannot be used successfully for demodulating the data symbols. In addition to having the same time-basis among the interlaces, the time basis of the channel estimate and the OFDM symbol that is to be demodulated with the estimate need to match. Accordingly, it is has been recognized that the time-bases of the interlaces need to match, and further that the time-basis of the interlaces match the time-basis of the OFDM symbol to be demodulated. In order to effect such alignment and matching, the following subject matter addresses exemplary methodologies and apparatus for effecting this.

It is noted that adjusting or aligning the time basis of pilot interlaces may be accomplished in either time or frequency domain. For simplicity, the following discussion relates in a concise manner how to change the time-basis of a single interlace. These techniques can be thought of as building blocks to be arranged appropriately in the channel estimation and demodulation algorithm to achieve alignment of the time-basis for multiple interlaces, for example.

Concerning adjusting time bases in frequency domain, it is noted that in equation (10) above, a timing update of $a_n$ chips applied at time n leads to a phase-shift in frequency domain.

To change the time-basis of the pilot tones $P_{l,[n]_4}$ to the time-basis of the pilot-tones $P_{l,[n-1]_4}$ this phase shift needs to be reversed. More generally, to change the time-basis of pilots $P_{l,[n]_4}$ to time m the difference of the FFT windows at times n and m in samples must be known. This difference can be obtained by summing the individual timing updates between times n and m, this sum refereed to herein as a. Then the pilot tones $P_{l,[n]_4}$ with time-basis corresponding to time m can be obtained according to equation (11) below.:

$$P_{\sim l,[n]_4} = e^{+j\frac{2\pi}{N_{RX\_FFT}}a(12l+3[n]_4)} e^{-j\frac{2\pi}{N_{RX\_FFT}}a\left\lfloor \frac{N_K}{2} \right\rfloor} P_{l,[n]_4}. \quad (11)$$

If, on the other hand, determination of the pilot tones $P_{l,[m]_4}$ with time basis corresponding to time n is desired, the sign in the phase adjustments need to changed as demonstrated in equation (12) below.

$$P_{\sim l,[m]_4} = e^{-j\frac{2\pi}{N_{RX\_FFT}}a(12l+3[n]_4)} e^{+j\frac{2\pi}{N_{RX\_FFT}}a\left\lfloor \frac{N_K}{2} \right\rfloor} P_{l,[m]_4}. \quad (12)$$

Adjusting the time-basis in frequency domain is beneficial if interlaces are combined in frequency. It may also be useful when the interlaces are combined in time-domain to know that the time-basis of an interlace needs to be changed before taking the IFFT.

Alternatively, if the pilot interlaces are combined in the time-domain, it is necessary to find the equivalent operations for phase shifting in the time domain. This problem is addressed in U.S. patent application Ser. No. 11/373,764, incorporated by reference herein, but particularities of certain OFDM systems such as DVB-T/H and ISDB-T scattered pilot arrangements require additional consideration for adjusting the time bases.

In order to derive the effect on the time-domain interlaces, it is noted that equation (10) can be rewritten as follows:

$$H_{k,n} = e^{-j\frac{2\pi}{N_{RX\_FFT}}a\frac{N_{RX\_FFT}}{3N_P}k} e^{+j\frac{2\pi}{N_{RX\_FFT}}a\left\lfloor \frac{N_K}{2} \right\rfloor} H_{k,m}, \quad (13)$$

where the timing update is generalized from time m to n and wherein, for example, in the cases of ISDB-T and DVB-T/H systems $$\alpha = \frac{3N_P}{N_{RX\_FFT}}a = \begin{cases} \frac{3}{4}a \text{ for } ISDB-T \\ \frac{3}{2}a \text{ for } DVB-T/H \end{cases}. \quad (14)$$

For the following equations discussed herein to hold exactly, an assumption is made that α is an integer. In other words, if the time-bases of interlaces are to be adjusted in the time domain, timing updates can only be made as multiples of 4 samples in ISDB-T and 2 samples in DVB-T/H. This constraint has its roots in the scattered pilot spacing and the consequently different sampling frequency for the time-domain channel estimate in these standards. In other ODFM systems, such as a FLO system, this restriction does not arise, since the scattered pilot spacing is in multiples of 8 carriers for those standards, opposed to 12 in ISDB-T and DVB-T/H. Practically, this restriction is not grave, since a resolution of 3.9 μs (ISDB-T) and 0.22 μs (DVB-T/H with 8 MHz bandwidth) is still sufficient to place the FFT window. Moreover, if α is not an integer, this value can be rounded to the closest integer and, while the timing corrections will not be perfect, performance is better compared to no correction at all.

With the assumption that α is an integer, similar techniques to those discussed previously with regard to combining interlaces in the time domain can be applied. Accordingly, it can be shown that the time-domain interlace of time m can change its time-basis by a samples according to the following relationship.

$$\tilde{h}_{k,m} = e^{+j\frac{2\pi}{N_{RX\_FFT}}a\frac{N_K}{2}} e^{-j\frac{2\pi}{N_{RX\_FFT}}3a[m]_4} \tilde{h}_{[k-\alpha]_{N_{IL}},m} \quad (15)$$

$$= e^{+j\frac{2\pi}{N_{RX\_FFT}}a\frac{N_K}{2}} e^{-j\frac{2\pi}{N_P}\alpha[m]_4} \tilde{h}_{[k-\alpha]_{N_{IL}},m}.$$

Conceptually, the import of the above equations (13)-(15) is that the channel time-interlace simply is shifted cyclically in time and experiences a phase shift. Since in the interlace combining algorithm the phase de-ramped interlace buffers $\underline{b}_{k,m}$ are used instead of the $\tilde{h}_{k,m}$, it is important to understand how the interlace buffers can switch time-bases.

First, considering that α>0, $\underline{b}_{k,m}$ (the interlace buffer corresponding to time m which new time-basis a samples delayed) can be defined as:

$$\begin{bmatrix} \underline{b}_{0,m} & \cdots & \underline{b}_{N_{IL}-1,m} \end{bmatrix} = e^{j\frac{2\pi}{N_{RX\_FFT}}a\frac{N_K}{2}} e^{-j\frac{2\pi}{N_P}\alpha[m]_4} \cdot \quad (16)$$

$$\begin{bmatrix} e^{j\frac{2\pi}{N_P}[m]_4 0} \tilde{h}_{N_{IL}-\alpha,m} & \cdots & e^{j\frac{2\pi}{N_P}[m]_4(\alpha-1)} \tilde{h}_{N_{IL}-1,m} & e^{j\frac{2\pi}{N_P}[m]_4\alpha} \tilde{h}_{0,m} & \cdots & e^{j\frac{2\pi}{N_P}[m]_4(N_{IL}-1)} \tilde{h}_{N_{IL}-1-\alpha,m} \end{bmatrix}.$$

Next, $\tilde{h}_{l,m}$ is replaced with $$b_{l,m}e^{-j\frac{2\pi}{N_P}ml}$$

and it is recognized that the $b_{k,m}$ for $\alpha \leq k \leq N_{IL}-1$ are simply $b_{k-\alpha,m}$. Accordingly, for $0 \leq k \leq \alpha-1$, the following relationship can be obtained.

$$[\underline{b}_{0,m} \cdots \underline{b}_{\alpha-1,m}] = e^{j\frac{2\pi}{N_{RX\_FFT}}\alpha\frac{N_K}{2}}e^{-j\frac{2\pi}{N_P}\alpha[m]_4} \cdot \quad (17)$$
$$\left[e^{j\frac{2\pi}{N_P}[m]_4 \cdot 0}e^{-j\frac{2\pi}{N_P}[m]_4(N_{IL}-\alpha)}b_{N_{IL}-\alpha,m} \cdots e^{j\frac{2\pi}{N_P}[m]_4(\alpha-1)}e^{-j\frac{2\pi}{N_P}[m]_4(N_{IL}-1)}b_{N_{IL}-1,m}\right],$$

which after realizing that $N_P=4N_{IL}$ can be simplified to the following:

$$[\underline{b}_{0,m} \cdots \underline{b}_{\alpha-1,m}] = \quad (18)$$
$$e^{j\frac{2\pi}{N_{RX\_FFT}}\alpha\frac{N_K}{2}} \cdot \left[e^{-j\frac{\pi}{2}[m]_4}b_{N_{IL}-\alpha,m} \cdots e^{-j\frac{\pi}{2}[m]_4}b_{N_{IL}-1,m}\right].$$

In summary for $\alpha>0$, (i.e., the channel is delayed and the FFT window advanced by $\alpha$ samples from time m to time n) in order to update the time basis of the time-domain interlace $\underline{b}_{k,m}$ the following operations need to be performed, accordingly.:

$$[\underline{b}_{0,m} \cdots \underline{b}_{N_{IL}-1,m}] = \quad (19)$$
$$e^{j\frac{2\pi}{N_{RX\_FFT}}\alpha\frac{N_K}{2}} \cdot \left[e^{-j\frac{\pi}{2}[m]_4}b_{N_{IL}-\alpha,m} \cdots e^{-j\frac{\pi}{2}[m]_4}b_{N_{IL}-1,m} \; b_{0,m} \cdots b_{N_{IL}-\alpha-1,m}\right].$$

Similarly, for $\alpha<0$ (i.e., the channel is advanced and the FFT window delayed by $\alpha$ samples from time m to time n), in order to update the time basis of the time-domain interlace $\underline{b}_{k,m}$ the following operations need to be performed:

$$[\underline{b}_{0,m} \cdots \underline{b}_{N_{IL}-1,m}] = e^{j\frac{2\pi}{N_{RX\_FFT}}\alpha\frac{N_K}{2}} \cdot \quad (20)$$
$$\left[b_{-\alpha,m} \cdots b_{N_{IL}-1,m} \; e^{j\frac{\pi}{2}[m]_4}b_{0,m} \cdots e^{j\frac{\pi}{2}[m]_4}b_{-\alpha-1,m}\right].$$

Conceptually, the interlace buffer is cyclically shifted, the spill-over taps are shifted with the trivial phases $$\left\{\frac{\pi}{2}\mu\right\}_{\mu=0}^{3} (\mu = m \bmod 4),$$

and all taps are multiplied with a constant phase due to the carrier arrangement. It is noted that the above-described multiplication with the constant phase offset is not necessary in FLO type OFDM systems because the guard carriers are included in the carrier numbering scheme and the pilot indexing for channel estimation assigns the DC carrier to index 0.

As mentioned previously, in addition to matching the time bases of the interlaces, it is also beneficial to match the time-basis of the interlaces with the OFDM symbol that is to be demodulated with the channel estimate obtained from combining the interlaces. While it may be possible to choose a common time-basis to coincide with the time-basis of the symbol that is to be demodulated, it is noted that in some cases this may not be possible or necessarily desirable. For example, a channel estimate obtained for time n to be used for demodulating OFDM symbol n, the channel estimate should have the time-basis corresponding to FFT window used for obtaining $Y_{k,n}$, where $Y_{k,n}$ is the receiver FFT output at a carrier k and an OFDM symbol time n. Depending on the implementation, however, it may not be possible that the time-basis of the channel estimate for time n matches the one for $Y_{k,n}$. For purposes of the present disclosure, a channel estimate that has the correct time-basis is referred to as $\hat{H}_{k,n}$ while an estimate with the incorrect time-basis is referred to as $\hat{\underline{H}}_{k,n}$. In the discussion to follow, at least two different options on how to correct the situation where the channel estimate has an incorrect time basis are presented.

The first option is to correct in the frequency domain. For demodulation, the channel estimate for carrier k is multiplied by $Y_{k,n}$ with the data carrier and the phase shift caused by the different time-bases can be corrected by the following relationship:

$$Z_{k,n} = e^{-j\frac{2\pi}{N_{RX\_FFT}}\alpha k} e^{+j\frac{2\pi}{N_{RX\_FFT}}\alpha\lfloor\frac{N_K}{2}\rfloor} \hat{\underline{H}}_{k,n} Y_{k,n}, \quad (23)$$

where it is assumed that the difference between time bases for $\hat{\underline{H}}_{k,n}$ and the FFT window n is $\alpha$ samples. This method requires at least $N_K$ complex multiplies (combining the two phase rotations to a single), which can operate either on $\hat{\underline{H}}_{k,n}$, $Y_{k,n}$, or their product.

A second option, on the other hand, is to correct the channel estimate in time-domain. As discussed previously, the channel estimate $\hat{\underline{H}}_{k,n}$ is obtained through an FFT of $\hat{\underline{h}}_{k,n}$ (which in turn is just a thresholded version of $\underline{h}_{k,n}$ obtained from combining interlaces in time-domain or the IFFT of the combined interlaces in frequency domain) with zero-padding. Thus, the zero-padded $\hat{\underline{h}}_{k,n}$ can be cyclically shifted by $$\alpha = \frac{3N_P}{N_{RX\_FFT}}a$$

positions (assuming as above that α is an integer or rounded to the nearest integer). Thus, $\hat{H}_{k,n}$ can be determined by taking the FFT of the following:

$$e^{-j\frac{2\pi}{N_{RX\_FFT}}a\frac{N_K}{2}} \qquad (22)$$

$$\begin{bmatrix} \hat{h}_{\alpha,n-1} & \cdots & \hat{h}_{N_P-1,n-1} & 0 & \cdots & 0 & \hat{h}_{0,n-1} & \cdots & \hat{h}_{\alpha-1,n-1} \end{bmatrix}$$

for α>0. For negative α, on the other hand, the buffer is delayed by α positions, where the FFT of the following is taken.

$$e^{-j\frac{2\pi}{N_{RX\_FFT}}a\frac{N_K}{2}} \begin{bmatrix} 0 & \cdots & 0 & \hat{h}_{0,n-1} & \cdots & \hat{h}_{N_P-1,n-1} & 0 & \cdots & 0 \end{bmatrix}, \qquad (23)$$

where α leading zeros are inserted. Note the a constant phase shift needs to applied to all elements of the cyclically shifted buffer.

Figure 8:
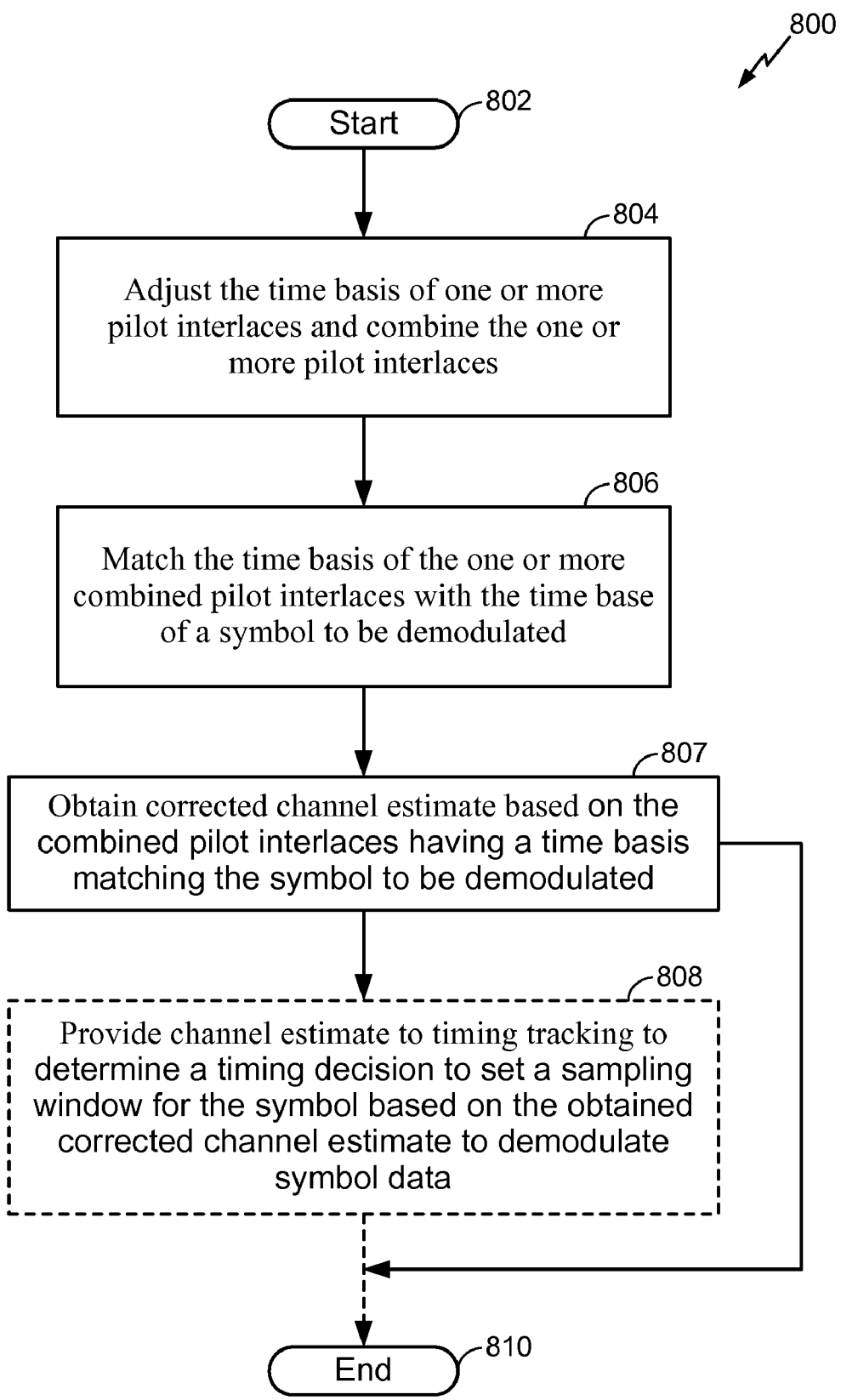
FIG. 8 illustrates a method for performing timing corrections in a wireless device.

FIG. 8 illustrates a flow diagram of a method for performing timing corrections in a multi carrier OFDM system, such as DVB-T/H and ISDB-T systems. As shown, the process 800 begins at a start block 802. Flow then proceeds to block 804 where an adjustment or "alignment" of the time bases of one or more pilot interlaces to a common time base and then combining the one or more pilot interlaces. This adjustment may be according to the methodology discussed previously in this disclosure, including adjusting in frequency or time domains. It is further noted that this adjustment may be effected by the channel estimation block 118, for example, a digital signal processor (DSP), a combination thereof, or any other suitable means.

After the time bases of the interlaces are adjusted and combined at block 804, flow proceeds to block 806 where the time basis of the combined interlaces are aligned or matched with a time basis of the OFDM symbol that is to be demodulated. This matching may be in accordance with the methodology discussed previously herein, including correcting the channel estimate in frequency domain or in time domain. Additionally, this functionality of block 806 may be effected by, for example, the channel estimation block 118, a digital signal processor (DSP), a combination thereof, or any other suitable means. After block 806, flow proceeds to block 807, where a channel estimate (i.e., a corrected channel estimate) is obtained based on the combined pilot interlaces having a time basis matching the symbol to be demodulated. After determination of the channel estimate, process 800, when viewed as a process for obtaining a corrected channel estimate, may proceed to termination block 810 where the process ends as shown in FIG. 8.

However, an additional or alternative flow is also illustrated in FIG. 8. In particular, flow may proceed from block 807 to block 808 (shown with dashed lines) where the channel estimate is provided to timing tracking to determine a timing decision to set the timing window (e.g., the FFT window) for the subsequent OFDM symbol (e.g., the symbol n to be demodulated) based on the obtained corrected channel estimate. The functionality of block 808 may be effected by the channel estimation block 118 in conjunction with the time tracking block 120, as examples.

While, for purposes of simplicity of explanation, the methodology is shown and described as a series or number of acts, it is to be understood that the processes described herein are not limited by the order of acts, as some acts may occur in different orders and/or concurrently with other acts from that shown and described herein. For example, those skilled in the art will appreciate that a methodology could alternatively be represented as a series of interrelated states or events, such as in a state diagram. Moreover, not all illustrated acts may be required to implement a methodology in accordance with the subject methodologies disclosed herein.

Figure 9:
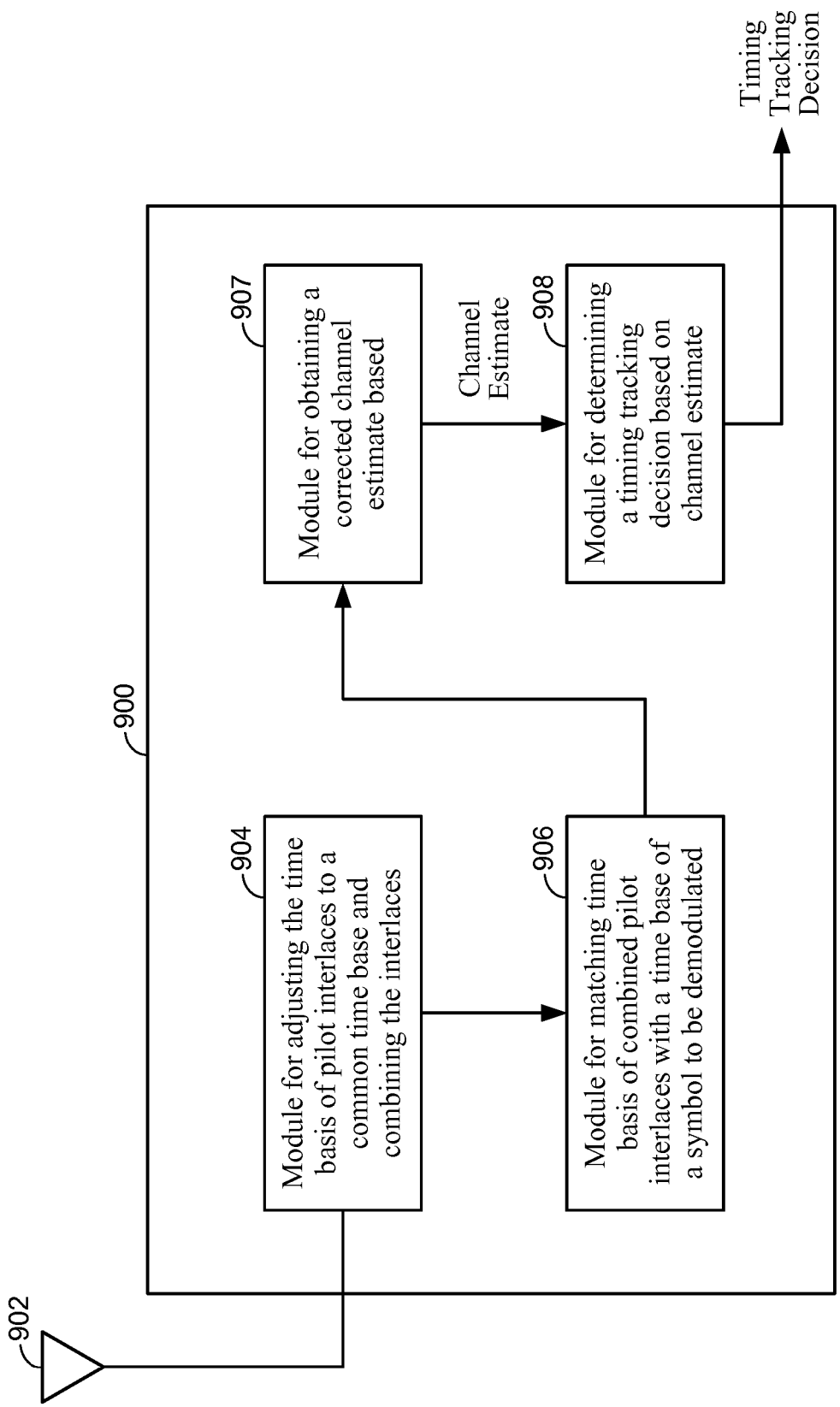
FIG. 9 illustrates another apparatus for performing timing corrections in a wireless device.

FIG. 9 illustrates another apparatus for performing timing corrections in a wireless device. The apparatus 900 receives a wireless signal, such as an OFDM signal, at an antenna 902, which delivers the signal to a module 904 for adjusting the time basis of pilot interlaces to a common time base and combining the interlaces. It is noted that module 904 may be implemented by one or more of elements 102, 104, 106, 108, 110, 116, and 118 illustrated in FIG. 1, as an example. After the pilot interlaces are combined by module 904, the interlaces are delivered to a module 906 for matching the time basis of the combined pilot interlaces with a time base of a symbol to be demodulated. Module 906 may be implemented by channel estimation block 118 in FIG. 1, a DSP, a combination thereof, or any other suitable hardware, software, or firmware.

Once module 906 has aligned or matched the time bases of the combined interlaces and the symbol, a module 907 determines a corrected channel estimate based on combined pilot interlaces having a time basis matching the symbol. It is noted that module 907 may be implemented by channel estimation block 118 in FIG. 1, a DSP, a combination thereof, or any other suitable hardware, software, or firmware. Module 907 outputs the corrected channel estimate to a module 908 for determining a timing tracking decision based on the channel estimate. Module 908 may be implemented, for example, by channel estimation block 118, timing tracking block 120, the sample server 104, or any combination thereof. The timing decision derived by module 908 may be used by the sample server 104, for example, to set (e.g., advance/retard) the FFT window for sampling the received communication signals. It is noted that apparatus 900 may be implemented within a transceiver, such as an OFDM transceiver, and may consist of hardware, software, firmware, or any combination thereof.

The techniques and methodologies presented above can be thought of as building blocks that enable a designer to make the best possible choices for a specific implementation. An exemplary implementation of one set of choices is discussed in the following paragraphs. It is noted that for other implementation constraints, one skilled in the art will appreciated that a different set of choices may lead to other simplifications.

According to an example, timing updates in frequency may be efficiently executed with a 7 interlace combining channel estimation algorithm. For purposes of this example, an architecture in which the pilot interlaces are buffered in DSP memory is assumed. Their time-basis is adjusted such that it corresponds to the demodulated symbol. Since $N_c=N_{nc}=3$ is chosen (i.e., 7 interlaces are combined, three of which non-causally), the current interlace has to be adjusted to the time basis corresponding to three symbols earlier before the interlaces are combined. The combining of the interlaces is performed by the DSP in the frequency domain to avoid additional direct memory access (DMA) transfers between the FFT engine and DSP memory. Thus there is a need to correct for the timing changes in frequency domain by changing the phase of the interlaces. The details of how the phases are updated are discussed below.

Since the sampling frequency in DVB-T/H is about 8 times higher than in ISDB-T, the time resolution could be correspondingly higher. Such a fine resolution is, however, not required by the fine-time tracking algorithms. Moreover, a resolution of 1 cx1 in DVB-T/H would require as smallest phase increment 3 2π/8192 while the hardware rotator used in part of the timing adjustment resolves the whole circle in only 2048 pieces. Thus, the fine-timing algorithm need only issue timing updates as multiples of 8cx1 in DVB-T/H, which ensures that the hardware rotator and DSP can perform all required rotations described below with sufficient precision. This constraint is a pure implementation choice and not significant since in 8 MHz channels, 8cx1 correspond to 0.875 μs, i.e., the resolution is still sufficiently small when compared to the symbol or guard duration (smallest guard is 7 μs in mode 1 with 1/32 guard which is a highly unlikely combination).

As pointed out above, the strategy is to adjust the timing of the 7 interlaces combined in channel estimation for time n such that their time-basis matches the time-basis of data-symbol n. This is achieved by ensuring that the six "old" interlaces have a timing corresponding to n and rotating the pilot tones of the latest interlace to be used in the combination (obtained at time n+3) back to time n. So for the latest interlace the effect of the timing updates at times n+1, n+2, and n+3 needs to be reversed. It is possible to denote the sum of these timing updates (CUM_T) with the following equation:

$$\text{CUM\_T} = \sum_{k=1}^{3} a_{n+k} \quad (24)$$

The current (n+3) pilot tones with $$P_{l,m} = e^{j\frac{2\pi}{N_{RX\_FFT}}\text{CUM\_T}\left(12l+3m-\left\lfloor\frac{N_K}{2}\right\rfloor\right)} \tilde{P}_{l,m}, \quad (25)$$

where $\tilde{P}_{l,m}$ is the pilot tone with timing corresponding to n+3. This rotation may be performed with a hardware rotator (e.g., 106) under the direction of a DMP (Data Mover Processor). After combining the 7 interlaces for the channel estimate, it needs to be ensured that the 6 interlaces that are going to be used at time n+1 have the right timing, i.e., they need to be updated with the timing update corresponding to time n+1 as mathematically represented by the following equation:

$$\tilde{P}_{l,m} = e^{-j\frac{2\pi}{N_{RX\_FFT}}a_{n+1}\left(12l+3m-\left\lfloor\frac{N_K}{2}\right\rfloor\right)} P_{l,m}. \quad (26)$$

Conceptually, the timing of the buffered pilot interlaces lags the time-tracking algorithm by 3 symbols. The update corresponding to the adjustment $a_{n+1}$ is performed in the DSP according to the algorithm visualized in FIG. 10. The idea is to calculate $$e^{-j\frac{2\pi}{N_{RX\_FFT}}12a_{n+1}} \text{ and } e^{-j\frac{2\pi}{N_{RX\_FFT}}3a_{n+1}}$$

Figure 10:
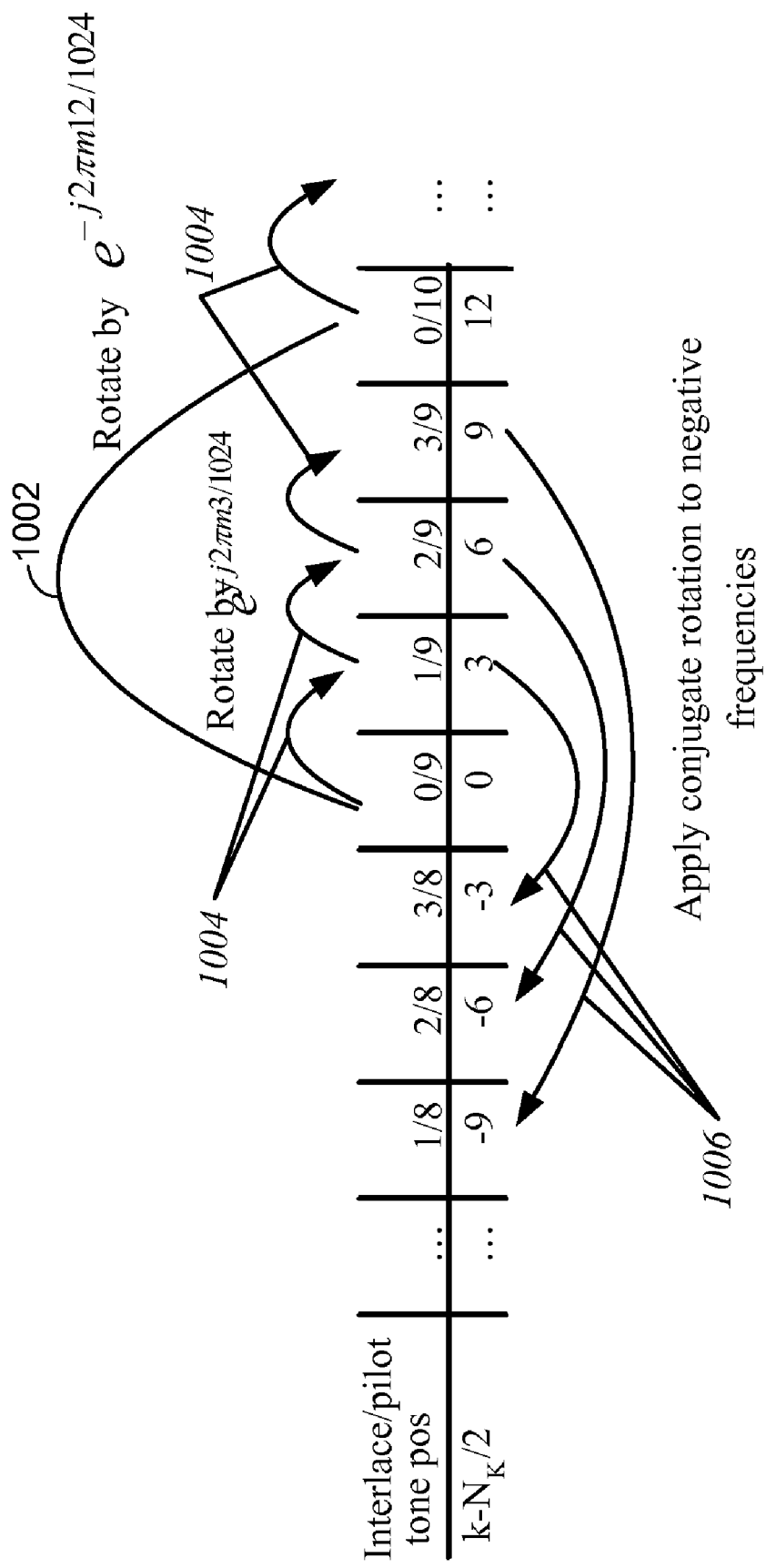
FIG. 10 illustrates a visualization of performing timing updates in a wireless communication system.

(via polynomial approximation in the DSP) and make use of the fact that in both ISDB-T and DVB-T/H a pilot tone is on DC. Starting from the DC pilot tone 0, which does not require any rotation, the necessary rotation is accumulated in a staggered fashion. As shown in FIG. 10, the staggering chosen for implementation includes only two stages. One rotator moves over 4 pilot tones, as indicated by arrow 1002, from interlace 0 and pilot tone position 9 to interlace 0 and pilot tone position 10, as an example, which is a rotation of $e^{-j2\pi m12/1024}$ or, in other words, 12 carrier frequencies from the DC tone 0 to tone 12. Another rotator covers the phases in-between as indicated by arrows 1004, showing rotation from one interlace/tone position to the next. This smaller rotation is a rotation by $e^{-j2\pi m3/1024}$, or 3 carrier frequencies (e.g., from carrier 0 (i.e., DC pilot tone) to carrier 3 to carrier 6, etc.). By carefully choosing the number of stages (2 in the example) and size of individual updates the necessary cycles to compute the phase updates (i.e., precision) can be traded off with fixed-point error. It is noted, however, that further numbers of stages could be implemented.

Since symmetry exists around the DC tone 0, rotation for the negative carrier tones may also be easily determined with the complex conjugates of $$e^{-j\frac{2\pi}{N_{RX\_FFT}}12a_{n+1}}$$

and $$e^{-j\frac{2\pi}{N_{RX\_FFT}}3a_{n+1}} \left(\text{i.e., } e^{j\frac{2\pi}{N_{RX\_FFT}}12a_{n+1}} \text{ and } e^{j\frac{2\pi}{N_{RX\_FFT}}3a_{n+1}}\right).$$

Thus, the conjugates can be applied in a symmetrical correspondence, as illustrated by arrows 1006 from carrier frequencies 3, 6, and 9, to corresponding symmetrical negative frequencies −3, −6, and −9 in order to determine rotation for the negative carrier tones.

In light of the foregoing, the disclosed apparatus and methods effect to adjusting timing by ensuring pilot tone interlaces have matching time bases, which also match a symbol time basis.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium (e.g., memory 122 in FIG. 1) is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. The word "exemplary" is used exclusively herein to mean "serving as an example, instance, or illustration." Any example described herein as "exemplary" is not necessarily to be construed as preferred or advantageous over other examples. Accordingly, the novel aspects described herein are to be defined solely by the scope of the following claims.

What is claimed is:

1. A method for timing correction in a communication system comprising:
adjusting, by a transceiver, a time basis of one or more pilot interlaces and combining the one or more pilot interlaces, wherein adjusting the time basis of the one or more pilot interlaces includes changing phases of one or more pilot tones of the one or more pilot interlaces to correct for changes in frequency, and wherein changing the phases of the one or more pilot tones comprises:
performing, by a rotator in the transceiver, a sequence of rotations of at least one pilot tone through a number of phase rotations; and
performing, by the rotator in the transceiver, a single rotation of the at least one pilot tone where the single rotation is equivalent to the number of phase rotations;
matching, by a channel estimator in the transceiver, the time basis of the combined pilot interlaces with a symbol to be demodulated; and
obtaining, by the channel estimator in the transceiver, a corrected channel estimate based on the combined pilot interlaces having a time basis matching the symbol.

2. The method as defined in claim 1, further comprising:
determining a timing decision to set a sampling window for the symbol based on the obtained corrected channel estimate.

3. The method as defined in claim 1, further comprising:
demodulating data contained in the symbol using the corrected channel estimate.

4. The method as defined in claim 1, wherein combining the one or more pilot interlaces is performed in at least one of frequency domain and time domain.

5. The method as defined in claim 1, wherein adjusting the time basis of the one or more pilot interlaces is performed in at least one of frequency domain and time domain.

6. The method as defined in claim 1, wherein matching the time basis of the combined pilot interlaces with a symbol to be demodulated is performed in at least one of frequency domain and time domain.

7. An apparatus for use in a wireless transceiver, the apparatus comprising:
a processor, comprising:
a first module configured to adjust a time basis of one or more pilot interlaces, including changing phases of one or more pilot tones of the one or more pilot interlaces to correct for changes in frequency, and combine the one or more pilot interlaces, the first module being further configured to change phases of the one or more pilot tones, including performing a sequence of rotations of at least one pilot tone through a number of phase rotations, and performing a single rotation of the at least one pilot tone where the single rotation is equivalent to the number of phase rotations;
a second module configured to match the time basis of the combined pilot interlaces with a symbol to be demodulated; and
a third module for obtaining a corrected channel estimate based on the combined pilot interlaces having a time basis matching the symbol.

8. The apparatus as defined in claim 7, further comprising:
a fourth module configured to determine a timing decision to set a sampling window for the symbol based on the obtained corrected channel estimate.

9. The apparatus as defined in claim 7, wherein the corrected channel estimate is used to demodulate data contained in the symbol.

10. The apparatus as defined in claim 7, wherein the first module is configured to combine the one or more pilot interlaces is performed in at least one of frequency domain and time domain.

11. The apparatus as defined in claim 7, wherein the first module is configured to adjust the time basis of the one or more pilot interlaces in at least one of frequency domain and time domain.

12. The apparatus as defined in claim 7, wherein the second module is configured to match the time basis of the combined pilot interlaces with a symbol to be demodulated in at least one of frequency domain and time domain.

13. A transceiver for use in a wireless system comprising:
a channel estimation unit configured to adjust a time basis of one or more pilot interlaces and combine the one or more pilot interlaces, match the time basis of the combined pilot interlaces with a symbol to be demodulated, a and obtain a corrected channel estimate based on the combined pilot interlaces having a time basis matching the symbol;
a rotator unit configured to change phases of one or more pilot tones, including performing a sequence of rotations of at least one pilot tone through a number of phase rotations, and performing a single rotation of the at least one pilot tone where the single rotation is equivalent to the number of phase rotations; and
a timing tracking unit configured to set timing of a discrete Fourier transform unit based on the corrected channel estimate.

14. The transceiver as defined in claim 13, further comprising:
a demodulation unit configured to received and use the corrected channel estimate to demodulate data contained in the symbol.

15. The transceiver as defined in claim 13, wherein the channel estimation unit is configured to combine the one or more pilot interlaces in at least one of frequency domain and time domain.

16. The transceiver as defined in claim 13, wherein the channel estimation unit is configured to adjust the time basis of the one or more pilot interlaces in at least one of frequency domain and time domain.

17. The transceiver as defined in claim 13, wherein the channel estimation unit is configured to match the time basis of the combined pilot interlaces with a symbol to be demodulated in at least one of frequency domain and time domain.

18. The transceiver as defined in claim 13, wherein the channel estimation unit is configured to adjust the time basis of the one or more pilot interlaces, including changing phases of one or more pilot tones of the one or more pilot interlaces to correct for changes in frequency.

19. An apparatus for use in a wireless transceiver, comprising:
means for adjusting a time basis of one or more pilot interlaces to a common time base and combining the one or more pilot interlaces, wherein the means for adjusting the time basis of the one or more pilot interlaces includes means for changing phases of one or more pilot tones of the one or more pilot interlaces to correct for changes in frequency, and wherein the means for changing the phases of the one or more pilot tones comprises:
means for performing a sequence of rotations of at least one pilot tone through a number of phase rotations; and
means for performing a single rotation of the at least one pilot tone where the single rotation is equivalent to the number of phase rotations;
means for aligning the time basis of the combined pilot interlaces with a symbol to be demodulated; and
means for obtaining a corrected channel estimate based on the combined pilot interlaces having a time basis matching the symbol.

20. The apparatus as defined in claim 19, further comprising:
means for determining a timing decision to set a sampling window for the symbol based on the obtained corrected channel estimate.

21. The apparatus as defined in claim 19, further comprising:
means for demodulating data contained in the symbol using the corrected channel estimate.

22. The apparatus as defined in claim 19, wherein the means for combining the one or more pilot interlaces is configured to combine in at least one of frequency domain and time domain.

23. The apparatus as defined in claim 19, wherein the means for adjusting the time basis of the one or more pilot interlaces is configured to adjust the time basis in at least one of frequency domain and time domain.

24. The apparatus as defined in claim 19, wherein the means for matching the time basis of the combined pilot interlaces with a symbol to be demodulated is configured to match in at least one of frequency domain and time domain.

25. A computer program product tangibly embodied on a non-transitory computer-readable storage medium, the computer program product comprising instructions operable to cause a computer to perform the operations comprising:
adjusting, by a transceiver, a time basis of one or more pilot interlaces and combining the one or more pilot interlaces, wherein adjusting the time basis of the one or more pilot interlaces includes changing phases of one or more pilot tones of the one or more pilot interlaces to correct for changes in frequency, and wherein changing the phases of the one or more pilot tones comprises:
performing a sequence of rotations of at least one pilot tone through a number of phase rotations; and
performing a single rotation of the at least one pilot tone where the single rotation is equivalent to the number of phase rotations;
matching, by the transceiver, the time basis of the combined pilot interlaces with a symbol to be demodulated; and
obtaining, by the transceiver, a corrected channel estimate based on the combined pilot interlaces having a time basis matching the symbol.

26. The computer program product of claim 25, further comprising:
determining a timing decision to set a sampling window for the symbol based on the obtained corrected channel estimate.

27. The computer program product of claim 25, further comprising:
demodulating data contained in the symbol using the corrected channel estimate.

28. The computer program product of claim 25, wherein combining the one or more pilot interlaces is performed in at least one of frequency domain and time domain.

29. The computer program product of claim 25, wherein adjusting the time basis of the one or more pilot interlaces is performed in at least one of frequency domain and time domain.

30. The computer program product of claim 25, wherein matching the time basis of the combined pilot interlaces with a symbol to be demodulated is performed in at least one of frequency domain and time domain.

* * * * *